UNITED STATES PATENT OFFICE 2,300,645

RESINOUS COMPOSITION

Herman A. Bruson and James L. Rainey, Philadelphia, Pa., assignors to The Resinous Products & Chemical Company, Philadelphia, Pa.

No Drawing. Application October 3, 1940, Serial No. 359,544

9 Claims. (Cl. 260—42)

This invention relates to resinous compositions obtained by combining bisthioammeline polyalkylene ether-formaldehyde condensates and alkyd resins having free hydroxyl groups.

The preparation of bisthioammeline polyalkylene ethers is described in U. S. Patent 2,202,828. The condensation of those ethers with aldehydes to form resins of wide technical value is described in our copending application Serial No. 297,280 filed September 30, 1939, now Patent 2,217,667. The present application is a continuation-in-part of the latter patent and deals particularly with coating compositions obtained by combining the bisthioammeline polyalkylene ether-formaldehyde condensates with alkyl resins containing free hydroxyl groups.

The bisthioammeline polyalkylene ether-formaldehyde condensates are obtained by heating together formaldehyde and a compound of the formula—

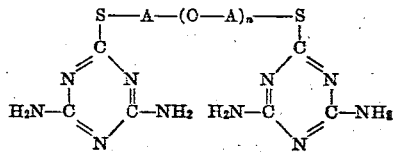

wherein A represents a lower alkylene group having a chain of at least two carbon atoms, such as —CH₂CH₂—, —CH₂CH₂CH₂—, —CH₂CH(CH₃)—, —CH₂CH₂CH₂CH₂—, etc., and $n$ represents a small integer, preferably from one to five. The preferred compound of this type is β,β'-bisthioammeline diethyl ether.

In conjunction with a bisthioammeline polyalkylene ether there may be used an open-chain carbamide such as urea, or thiourea, or a phenyl- or alkyl-substituted urea. When a carbamide is used in conjunction with the thioammeline ether the proportion of thioammeline ether to carbamide should not be less than one to three.

The formaldehyde used may be in aqueous or organic solvent solution or in the form of a polymer such as paraformaldehyde. There may also be used in conjunction with formaldehyde other aldehydes such as acetaldehyde, butyraldehyde, benzaldehyde, furfuraldehyde, etc. or mixtures of aldehydes, when special properties are required. In part there may also be used as a source of formaldehyde hexamethylene tetramine or a soluble condensate of urea and formaldehyde.

A bisthioammeline polyalkylene ether and formaldehde may be reacted to give a condensate thereof by heating, usually between about 60° and 100° C., in aqueous or organic solvent solution. Higher temperatures may be used when solvents boiling above water are employed or the reaction is conducted under pressure. After a soluble condensate has been formed, it is preferably reacted with an alcohol to give a bisthioammeline polyalkylene ether-formaldehyde-alcohol condensate, which is of particular value for use in conjunction with alkyd resins. If desired, the primary condensation of ether and aldehyde may be performed with an anhydrous form of aldehyde, such as paraformaldehyde in the presence of an alcohol as the reaction medium. When an acid catalyst is added to this system, the ether-formaldehyde-alcohol condensates result directly. This method has the advantage of making unnecessary the separation of a methylol compound or the preliminary removal of water.

As an alcohol there may be used a monohydric or polyhydric alcohol. The alcohol serves both as solvent and as reactant. Typical monohydric alcohols are ethyl, propyl, isopropyl, butyl, octyl, etc. while the polyhydric are represented by the glycol, such as ethylene glycol, glycerine, sorbitol, etc. There may also be used mixed-type molecules containing free alcoholic hydroxyl groups such as ethers or esters of polyhydric alcohols or the chlorinated alcohols, the chlorohydrins. These various types of alcohols react with formaldehyde and bisthioammeline polyalkylene ether or with preformed condensates of formaldehyde and said ether under the influence of acidic catalysts, such as formic, acectic, lactic, hydrochloric, sulfuric acid, etc.

In condensing ether, aldehyde, and alcohol it is generally advisable to remove the water of reaction as it is formed. This may be done in a simple fashion by heating the components in an apparatus connected to a fractionating column or a reflux condenser equipped with a water trap. Water may also be separated with the aid of desiccating reagents, such as calcium sulfate, activated alumina, calcium chloride, etc. Removal of water may often be accelerated by utilization of an azeotropic mixture, such as benzene-alcohol-water, which is removed with the aid of a fractionating column.

The preparation of bisthioammeline polyalkylene etheraldehyde condensates is illustrated in the examples which follow—

*Example 1.*—In 890 parts of butanol there was dissolved by refluxing 180 parts of paraformaldehyde. The solution was cooled to about 50° C. and 356 parts of β,β'-bisthioammeline diethyl ether added with good agitation. The reaction mixture was heated to 110° C. and after ten minutes at this temperature 5 parts of a 50% aqueous solution of formic acid was followed by 36 parts of xylene. Heating was continued with reflux from a vertical condenser, from which the return condensate was collected, the water separated and the alcohol and xylene returned. When about 90 parts of water had been thus separated, the evolution of water essentially ceased. At this point the solvent was allowed to distil from the reaction vessel until 250 parts of distillate had been collected. The solution remaining in the reaction vessel was slightly yellow in color and had a solids content of 60%. A sample adjusted to a 50% solids basis with xylene had a viscosity at 25° C. of E on the Gardner-Holdt scale.

Example 2.—126 parts of paraformaldehyde was dissolved in 326 parts of butanol by refluxing. The solution was then cooled to about 50° C. and 35.6 parts of β,β'-bisthioammeline diethyl ether and 108 parts of urea added with good agitation. The mixture was then heated to 110° C. After about fifteen minutes at this temperature seven parts of a 50% aqueous solution of formic acid was added, followed after ten more minutes by 14.4 parts of xylene. The solution was heated under reflux conditions and the water removed from the condensate. When water no longer was formed, some of the solvent was distilled from the reaction vessel, leaving a solution containing 55% solids. A sample, adjusted with xylene to a 50% solids basis, had a viscosity at 25° C. of P on the Gardner-Holdt scale. The product had a mineral thinner tolerance of 30 cc. per 10 gram sample.

In place of the β,β'-bisthioammeline diethyl ether in the above example there may be used an equivalent amount of the ether obtained by reacting two molecular proportions of thioammeline and one of dichlorotriglycol, an ether having the formula—

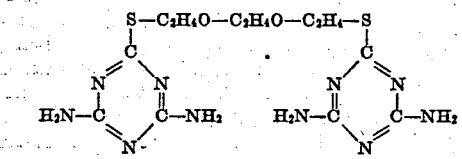

Example 3.—A mixture of 320 parts of paraformaldehyde, 1170 parts of ethanol, 632 parts of β,β'-bisthioammeline diethyl ether, and 200 parts of benzene was placed in a reaction vessel equipped with stirrer and fractionating column, having a condenser arm at the top of the column. The mixture was stirred and heated until refluxing began in the column and refluxing was continued for 45 minutes. There was then added three parts of a 50% aqueous solution of formic acid and refluxing was continued for two hours. A solution of three parts of oxalic acid in 30 parts of ethanol was added at this point with continuation of refluxing. Any aqueous condensate which separated in the condenser at the head of the column was removed. When the still head temperature had reached 66° C., collection of water essentially ceased. To ensure removal of water 375 parts of solvent was distilled through the fractionating column and removed. The solution in the reaction vessel possessed a solids content of 50% and had a viscosity at 25° C. of E on the Gardner-Holdt scale.

Any of the condensates, as prepared above, may be combined with alkyd resins having free hydroxyl groups. Such alkyd resins are obtained, as is known, by reacting a polyhydric alcohol, preferably in excess, with a polycarboxylic acid or with a polycarboxylic acid and a fatty acid or fatty glyceride, including mono-, di- and triglycerides. A suitable resin having free hydroxyl groups may be made by heating a mixture of 68 parts of glycerine, 100 parts of phthalic anhydride, and 75 parts of cocoanut oil fatty acid at 200° C. until a clear and homogeneous product is obtained with an acid number below 10. In place of the cocoanut oil fatty acids, other drying or non-drying fatty acids or their glycerides may be used, such as perilla oil, linseed oil, cottonseed oil, tung oil, sunflower oil, soya bean oil, etc. or the acids therefrom. Another type of hydroxyl-bearing alkyd resin may be made by heating a mixture of a polyhydric alcohol such as glycerine, polycarboxylic resin-forming acid such as phthalic acid or sebacic acid, and a hydroxylated monocarboxylic acid or glyceride thereof such as ricinoleic acid, castor oil, or monoglycerated ricinoleate. In place of ricinoleic acid or its glycerides there may be used other hydroxylated acids, such as the various hydroxystearic acids or their glycerides. In these resins the free hydroxyl group is in the monobasic acid radical.

The combination of these alkyd resins with the bisthioammeline polyalkylene ether-aldehyde condensates is illustrated in the following examples—

Example 4.—50 parts of the bisthioammeline ether resin solution from Example 1, containing 60% solids, was mixed with 100 parts of a xylene solution containing 60% of an alkyd resin prepared from phthalic anhydride, dehydrated ricinoleic acid, and an excess of glycerine, in which had been ground 88 parts of titanium dioxide and 2 parts of zinc oxide. The enamel thus prepared was adjusted to proper consistency with 87 parts of xylene. This enamel yields tough, mar-resistant films upon being cured at 250° F. for one hour or at 300° F. for 20 minutes or less. Curing temperatures as low as 200° F. are effective. Excellent color is obtained unless the curing temperature is made excessively high. Where high curing temperatures are required, better color is obtained by substitution in the above formula of an alkyd resin prepared with a non-drying oil, such as cocoanut oil or fatty acid. With the use of such an alkyd, a curing temperature of 300° F. for three hours brought no serious yellowing of the film.

Example 5.—There were ground together 97 parts of titanium dioxide, 3 parts of zinc oxide, and 125 parts of an alkyd resin prepared from phthalic anhydride, dehydrated castor oil fatty acid, perilla oil, and excess glycerine. The mixture was blended with 50 parts of the product from Example 3, above, and 85 parts of butanol. Films of this enamel can be cured more rapidly than the enamels described in the previous example. The cured films are hard, tough, mar-resistant, alkali- and solvent-resistant, spot-proof, and craze-proof.

Instead of the cold blending of a bisthioammeline polyalkylene ether-formaldehyde condensate and an alkyd resin as described in the previous examples, a condensate of a bisthioammeline polyalkylene ether and formaldehyde may be reacted with an alkyd resin having free hydroxyl groups in the presence of a suitable organic solvent such as an alcohol and a hydrocarbon. The condensate and alkyd resin are cross-linked through hydroxyl groups. At the same time some reaction between the condensate and alcohol occurs. This latter reaction improves the solubility of the reaction products. The reactions between condensate and alcohol and between condensate and alkyd resin are catalyzed by the presence of acids either supplied by the alkyd resin or added separately.

The reaction products obtained in this way possess excellent solubility in a wide variety of solvents and give films which are a further improvement in having superior color and color retention. The preparation of such products is illustrated in the following examples—

*Example 6.*—486 parts of a 37% aqueous solution of formaldehyde was heated at 85° C. Over a period of five minutes 356 parts of $\beta,\beta'$-bisthioammeline diethyl ether was added with good stirring to the formaldehyde solution and the mixture was maintained at 85° C. until the thioammeline ether was completely dissolved. The pH of the resulting solution was then adjusted to a pH between 6 and 7 by the addition of small amounts of soda ash solution and formic acid. The solution was strained to remove any solids particles which might be present and allowed to cool. Crystals formed. They were broken up, washed with water, and dried at about 40° C. The product thus obtained corresponded approximately to the hexamethylol derivative.

It was stirred into 850 parts of hot butanol and in a short time five parts of a 50% aqueous solution of formic acid and 40 parts of xylene were added. The mixture was refluxed for a few minutes when 100 parts of an alkyd resin prepared from glycerine, phthalic anhydride and castor oil was added in the form of a 60% solution in xylene. Heating was continued with the solvents refluxing from a condensing column. Water was separated as formed. When about 85 parts of water had been removed, conditions were adjusted so that about 200 parts of solvent were taken off as an overhead distillate. The residual solution had a solids content of about 60%, and yielded films of excellent color and hardness.

*Example 7.*—180 parts of paraformaldehyde was dissolved in 890 parts of butanol by heating to refluxing temperatures. The solution was cooled to about 75° C., and 356 parts of $\beta,\beta'$-bisthioammeline diethyl ether slowly added with good stirring. The temperature was then raised to 105° C. and maintained at this point until the ether had completely dissolved. Five parts of 50% aqueous formic acid was added at this point and shortly thereafter 36 parts of xylene. The solution was maintained under reflux and 180 parts of an alkyd resin prepared from glycerine, phthalic anhydride and castor oil was added. When 90 parts of water had been separated, the solvent was allowed to distill from the reaction vessel until the solution of copolymer had attained a solids content of 60%. A sample of this solution, adjusted with xylene to a 50% solids basis, had a viscosity at 25° C. of B on the Gardner-Holdt scale. The xylene tolerance of the product was three parts of xylene for ten parts of product by weight. Cured films from this composition were tough, adhesive, flexible, mar-resistant, and alkali-resistant. The clear lacquer was readily pigmented to give enamels of excellent properties.

*Example 8.*—The proportions and procedure of Example 7 were followed but with the substitution of an oxidizing alkyd resin for the one used above. The oxidizing alkyd resin was prepared from glycerine, phthalic anhydride, and dehydrated ricinoleic acid. The final solution had a solids content of 55%. A sample adjusted to a 50% solids basis had a viscosity at 25° C. of E on the Gardner-Holdt scale.

*Example 9.*—126 parts of paraformaldehyde was dissolved in 326 parts of normal butanol by heating. The solution was cooled to about 60° C. and 35.6 parts of $\beta,\beta'$-bisthioammeline diethyl ether and 108 parts of urea added. The temperature was raised to about 105–110° C. while the solution was stirred. Seven parts of 50% aqueous formic acid was added, followed by 14 parts of xylene. After the solution was refluxing well, 120 parts of an alkyd resin was added, prepared from glycerine, phthalic anhydride, and castor oil. When the evolution of water had substantially ceased, solvent was distilled from the reaction vessel until the remaining solution had a solids content of 55%. A sample, adjusted with toluene to a 50% solids basis, had a viscosity at 25° C. of F on the Gardner-Holdt scale.

Reaction may be carried to the stage of insolubility by simultaneously heating and mechanically working a mixture of a bisthioammeline polyalkylene ether-formaldehyde condensate and an alkyd resin having free hydroxyl groups. The resulting product is a tough rubbery mass, which may be dispersed in water with the aid of suitable dispersing agents. The properties of the rubbery mass may be considerably varied by the addition of modifying agents which alter such properties as gloss, hardness, tackiness, plasticity, etc. They include hard resins, such as natural resins, ester gums, oil-soluble phenol-formaldehyde resins, maleic anhydride-rosin reaction products, etc.; waxes, such as carnauba, montan, etc. Typical reaction products carried to a relatively insoluble stage are illustrated herewith.

*Example 10.*—(a) A heated mechanical mixer was charged with 22 parts of dibutyl phthalate, 72 parts of a resin obtained by heating 500 parts of rosin, 67 parts of maleic anhydride and 73 parts of glycerine at 250°–260° C., and 120 parts of an alkyd resin prepared as described in U. S. application Serial No. 336,059 filed May 18, 1940, by heating at 210° C. a mixture comprising 125 parts of the residue from the distillation of by-product acids from the preparation of sebacic acid from castor oil, 250 parts of phthalic anhydride and 512 parts of the monoglyceride of linseed oil. The mixture was agitated at 150° C. until fused. It was then cooled to 80° C. and 50 parts of the condensate from Example 1 added. The mixture was mechanically worked and heated at 125° C. for 45 minutes. The mass was then cooled; when the temperature dropped below 80° C., 18 parts of a high-boiling petroleum solvent was worked in. The product consisted of yellow particles of a rubber-like nature.

To the product there was added a paste consisting of 75 parts of water, 12 parts of casein, 2.5 parts of concentrated ammonia, 2.5 parts of phenol, and 6 parts of triethanolamine. Mechanical working was continued until a uniform dough was obtained. A dilute solution of ammonia (2 lbs. of concentrated ammonia in 50 lbs. of water) was slowly added until a creamy dispersion having 50% solids was produced. This dispersion was evaporated to give films which were tough, resistant to solvents, soaps, grease, etc., flexible, and adherent. The superior hardening action of the bisthioammeline ether-formaldehyde resins permits incorporation of greater amounts of alkyd resins than heretofore possible. The highly reacted materials also possess increased alkali-resistance.

(b) The above formulation was repeated with substitution of 50 parts of the reaction product of Example 2 for the 50 parts of condensate from Example 1. A rubbery product was likewise obtained which was dispersed with casein paste.

(c) The above formulation was again repeated but substituting the reaction product of Example 3. Tough, adherent films were obtained on evaporation of water from the aqueous dispersion. The dispersions are excellent adhesives for wood to metal.

When aqueous dispersions are not desired, the relatively insoluble reaction products may be worked and shaped mechanically, as for the formation of sheets for floor and wall coverings or in the extrusion of tubes or coverings on wires, etc.

The proportions of bisthioammeline polyalkylene ether-formaldehyde condensate to alkyd resin may be varied over an unusually wide range. With as little as 5 parts of the condensate to 95 parts of alkyd resin, the hardening effect begins to be appreciable with some alkyd resins. On the other hand, as high a proportion as 40 to 60 is permissible in some applications. Compositions having such high proportions are, furthermore, useful as stock commercial preparations which may be compounded with more alkyd resin of the same kind as already present in the mixture or of a different kind, and with other suitable materials for preparing lacquers or enamels, such as resins, waxes, pigments, fillers, solvents, etc.

Such lacquers or enamels provide excellent protective coatings on metal, wood, or other materials. For example, the combinations of bisthioammeline polyalkylene ether-formaldehyde condensate and alkyd resin provide refrigerator enamels which may be scrubbed, which are non-chipping yet hard and tough, which are non-absorbent of gases or odors, and which are grease-resistant and stain-proof. The combination is also highly satisfactory for finishing lockers, hospital furniture, metal furniture, etc. as well as for finishing wooden furniture in which case the addition of acid catalysts greatly reduces temperatures for curing.

In the final hardening or insolubilizing of the combinations of bisthioammeline polyalkylene ether resins with alkyd resins having free hydroxyl groups it is probable that most of the alcohol present is driven off. The final result is a reaction product of said ether, formaldehyde (or other aldehyde) and the alkyd resin.

We claim:

1. As a new composition of matter the reaction product of a bisthioammeline polyalkylene ether-formaldehyde condensate and an alkyd resin having free hydroxyl groups.

2. As a new composition of matter the reaction product of $\beta,\beta'$-bisthioammeline diethyl ether-formaldehyde condensate and an alkyd resin having free hydroxyl groups.

3. As a new composition of matter the reaction product of $\beta,\beta'$-bisthioammeline diethyl ether-formaldehyde condensate and an alkyd resin obtained from glycerine, phthalic anhydride, and castor oil.

4. As a new composition of matter the reaction product of an alkyd resin having free hydroxyl groups and a condensate of a bisthioammeline polyalkylene ether, an open-chain carbamide, and formaldehyde.

5. As a new composition of matter the reaction product of an alkyd resin having free hydroxyl groups and a co-condensate of $\beta,\beta'$-bisthioammeline diethyl ether, urea, and formaldehyde, in which the proportion of said ether to urea is at least one to three.

6. As a new composition of matter the reaction product of a bisthioammeline polyalkylene ether-formaldehyde condensate and an alkyd resin having free hydroxyl groups, said reaction product being formed under acidic conditions in the presence of an alcohol.

7. As a new composition of matter the reaction product of a $\beta,\beta'$-bisthioammeline diethyl ether-formaldehyde condensate and an alkyd resin having free hydroxyl groups, said reaction product being formed under acidic conditions in the presence of an alcohol.

8. As a new composition of matter the reaction product of a bisthioammeline polyalkylene ether-formaldehyde-alcohol condensate and an alkyd resin having free hydroxyl groups.

9. As a new composition of matter a resinous composition comprising an alcoholic solution of a condensate of a bisthioammeline-polyalkylene ether, formaldehyde, and an alcohol and an alkyd resin having free hydroxyl groups.

HERMAN A. BRUSON.
JAMES L. RAINEY.